United States Patent [19]
Klett

[11] 3,735,884
[45] May 29, 1973

[54] SYSTEM FOR LOADING TRUCKS AND WAREHOUSES

[76] Inventor: Robert H. Klett, 112 Gramaton Drive, Yonkers, N.Y.

[22] Filed: May 6, 1971

[21] Appl. No.: 140,737

[52] U.S. Cl. ................................214/515, 238/10 R
[51] Int. Cl. ..............................................B60p 9/00
[58] Field of Search .......................238/10 R, 5, 6, 4; 105/366 R, 368 B, 366 R; 104/268, 242, 172 B, 134, 262, 43, 42, 218; 214/515; 230/4, 10 R

[56] References Cited

UNITED STATES PATENTS

| | | | |
|---|---|---|---|
| 592,433 | 10/1897 | McClelland | 238/4 |
| 2,085,329 | 6/1937 | Porte | 238/4 |
| 1,207,728 | 12/1916 | Ellingson | 238/4 |
| 1,355,800 | 10/1920 | Shoemaker | 238/4 |
| 1,185,072 | 5/1916 | Durbin | 238/3 |
| 3,456,826 | 7/1929 | Pavlik | 214/515 |
| 3,165,216 | 1/1965 | Macksoud et al. | 214/515 |

Primary Examiner—James B. Marbert
Assistant Examiner—Richard A. Bertsch
Attorney—J. B. Felshin

[57] ABSTRACT

The system comprises tracks laid on the floors of trucks, trailers or warehouses, having funneled entry guides, and pallets having wheels received on the tracks for easier and speedier loading. Means is provided to quickly attach different sections of the track. A front plate carrying the entry funnel receives a pallet thereon by a fork lift truck, and from which plate, the pallet may be pushed onto the tracks.

15 Claims, 8 Drawing Figures

PATENTED MAY 29 1973 3,735,884

INVENTOR.
ROBERT H. KLETT
BY
J.B. Felshin
ATTORNEY

SYSTEM FOR LOADING TRUCKS AND WAREHOUSES

This invention relates to loading systems for trucks, trailers and warehouses.

An object of this invention is to provide a loading system of the character described which comprises sets of tracks placed on a truck, trailer or warehouse floor, and entry plates at the inlet ends of the tracks carrying funneled entry guides to lead the wheels of pallets to the tracks. A fork lift truck may place the pallet onto the entry plates, or the pallet may be pushed from a tail gate onto said plates. The pallets may be pushed from the plates to the tracks.

Another object of this invention is to provide a loading system of the character described having means to quickly and disconnectedly attach the plate to the tracks, and various sections of the tracks together, in tandem, to provide for quick assembly of the plates and tracks on truck body floors and warehouse floors.

A further object of this invention is to provide a loading system of the character described which can be made in various lengths and with an entry plate at either or both ends of each set of tracks.

Yet another object of this invention is to provide a loading system of the character described which can be made of knock-down construction to permit compact storage and shipment.

Still a further object of this invention is to provide a system of the character described in which the tracks and the wheel carriers on the undersides of pallets, can be made of extrusions.

Yet a further object of this invention is to provide a strong and durable loading system which shall be relatively inexpensive to manufacture, easy to assemble, safe in use, easy to ship and store, which may be tailor made to the needs with respect to length, and which shall yet be practical and efficient to a high degree in use.

Other objects of this invention will in part be obvious and in part hereinafter pointed out.

The invention accordingly consists in the features of construction, combinations of elements, and arrangement of parts, which will be exemplified in the construction hereinafter described, and of which the scope of invention will be indicated in the following claims.

Because of the low construction of the device it does not have to set or be recessed into the floor. The track is only three-eighths inch above floor surface. Other advantages are:

1. The fork lift truck does not enter the truck or trailor body.
2. Preserves floor of truck or trailer body.
3. It eliminates damage to side walls of truck or trailer bodies resulting from careless operation of the fork lift truck, thereby reducing present high cost of maintenance.

In the accompanying drawings in which is shown various illustrative embodiments of this invention, FIG. 1 is a horizontal cross-sectional view of a truck body looking down on tracks and on pallets forming part of the loading system embodying the invention;

Figure 1:
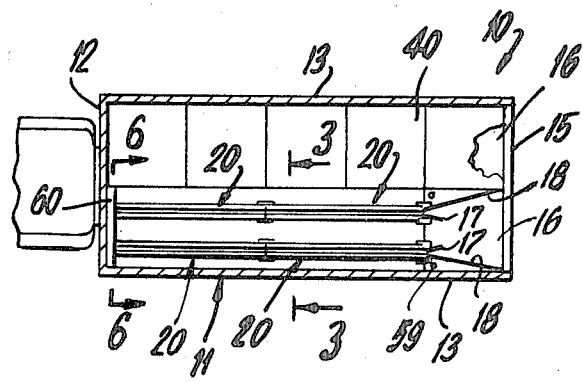
FIG. 1A is a top plan view of a floor of a warehouse, provided with a loading system embodying the invention.

Referring now in detail to the drawing, 10 designates a truck provided with a truck body 11 having a front wall 12, side walls 13 and a floor 14. Said truck body is open at the rear. The floor 14 has a rear end 15. Mounted on the floor 14, adjacent the rear end 15 are a pair of base or mounting plates 16, disposed side by side. Each plate may be half the width of the truck body floor. The plates may be made of steel and are about one-eighth of 1 inch in thickness. The plates are similar. Fixed to the upper surface of each plate are two pair of symmetrical guides 17, 18 made of square steel stock and are converging or inclined. One guide 18 extends to the left rear corner of plate 16 and inclines forwardly to the right while the other guide 18 extends to the right rear corner of the plate and inclines forwardly to the left. The guides 17 are shorter and incline oppositely to guides 18. The front ends of guides 17, 18 of each pair are somewhat spaced from each other. The guides 17, 18 may be secured to plates 16 by welding, screwing or by any other suitable means.

Figures 4, 4A:
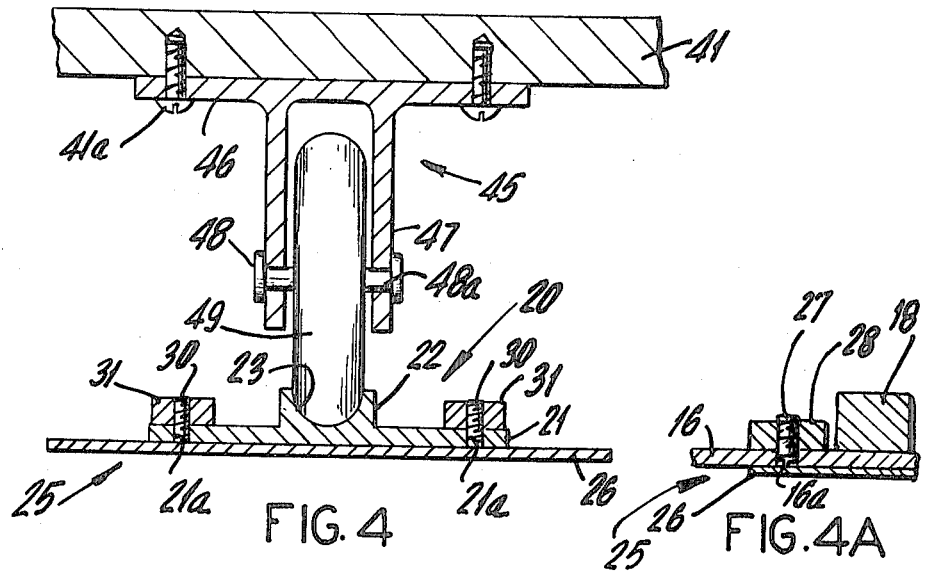
FIG. 4 is a further enlarged view taken on line 4—4 of FIG. 2.
FIG. 4A is a cross-sectional view taken on line 4A—4A of FIG. 2.
Figure 5:
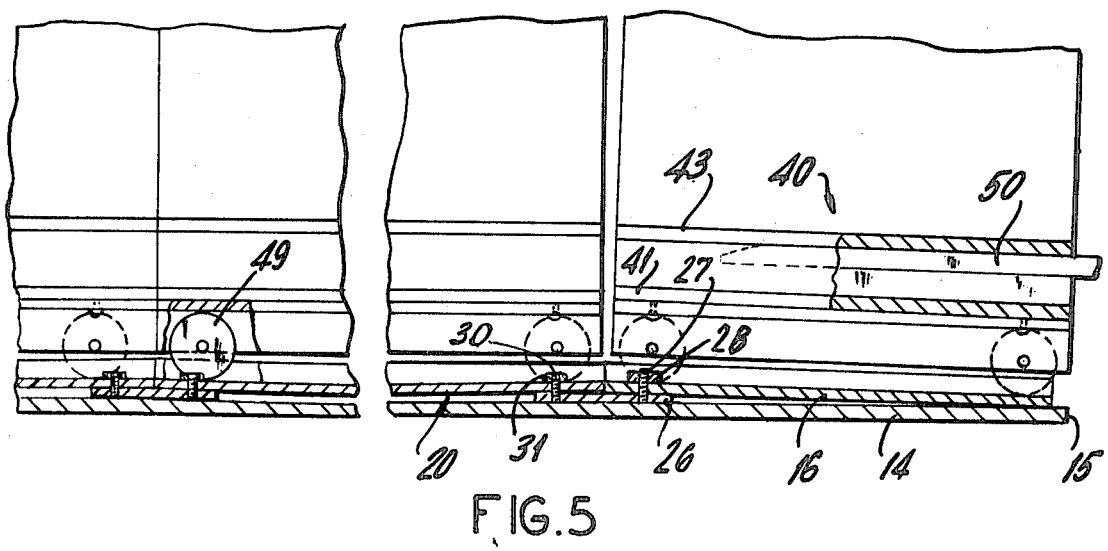
FIG. 5 is a cross-sectional view taken on line 5—5 of FIG. 2.

Disposed longitudinally of the truck body floor 14 are parallel, coextensive pairs of track sections 20 in tandem, extending from the front edge of plate 16 to the rear of the floor. Each track section 20 has a base flange 21 from which a central grooved longitudinal rail portion 22 projects upwardly. Rail 22 has a central groove 23 of semi-circular transverse shape. The thickness of base 21 is substantially similar to the thickness of plate 16. The front ends of grooves 23 of the two tracks align with the spaces between the forward ends of the guides 17, 18 for the purpose hereinafter appearing. Means is provided to quickly, detachably attach plates 16 to the adjacent ends of track sections 20. To this end there is provided at the rear end of each rear track section 20, an attaching device 25. Each attaching device 25 comprises a thin metal plate 26, to which are attached a pair of screws 27 projecting upwardly (see FIG. 4A) and passing through holes 16a in plate 16. Pins 27 project above the plate 16 and receive attaching nuts 28. Thus, devices 25 are easily and detachably attached to plate 16. Screw pins 30 (see FIG. 4) attached to plate 26 project up through holes 21a in bases 21 of the tracks. Nuts 31 are screwed to the upper, projecting ends of pins 30, to fix the rear end of the first track sections to plate 16. Hence devices 25 interconnect pairs of track sections to plate 16 in proper positions to be aligned with the narrow spaces between the guide bars 17, 18. It will be noted that pins 30 are closer together than pins 27.

Figure 2:
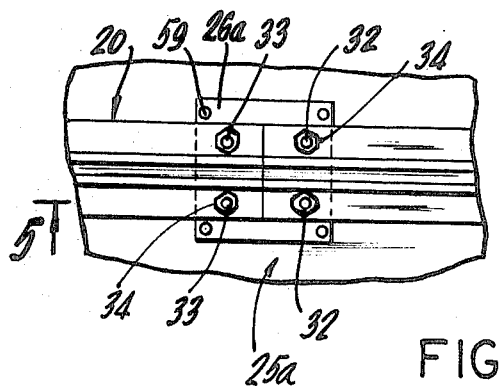
FIG. 2 is a partial, enlarged top plan view of the tracks and entrance plate of FIG. 1.
Figure 2:
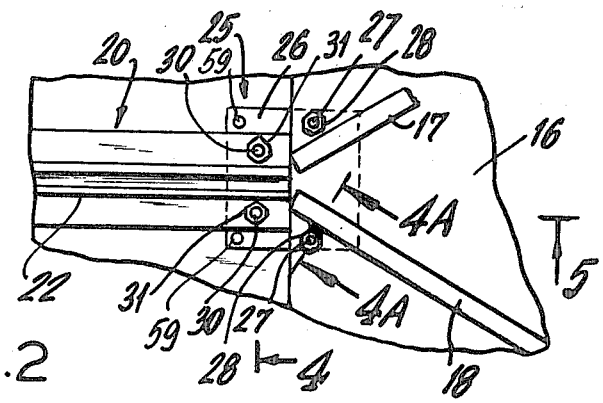
Figure 3:
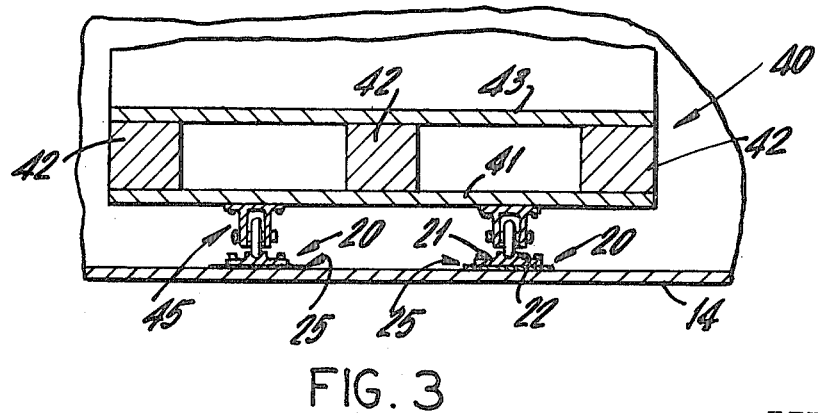
FIG. 3 is an enlarged cross-sectional view taken on line 3—3 of FIG. 1.

The front end of one pair of track sections are attached to the rear ends of a next adjacent pair of track sections, by means of attaching devices 25a comprising plates 26a having pairs of screw pins 32 and 33 passing upwardly through openings in the base and receiving nuts 34 in the manner that pins 30 receive nuts 31. Plates 26a lie under the adjacent ends of two adjacent tracks, as shown in FIG. 2. The thickness of the base 21 of track 20 is substantially similar to the thickness of plate 16 so that plate 16 is is in the plane of the base 21.

Mounted on the tracks are a plurality of similar pallets, skids or load supporting members 40. Each pallet 40 comprises a rectangular board 41 of the width of plate 16. On said load supporting members 40 are fixed parallel, spaced end and center, longitudinal spacers 42. On spacers 42 is mounted another rectangular board 43 similar to board 41 and coextensive therewith. Fixed to the underside of board 41 are a pair of parallel, spaced wheel carriers 45. Each carrier 45 may comprise a top plate 46 from which a pair of spaced parallel vertical flanges 47 project downwardly. Flanges 47 carry axles 48 on which wheels 49 are rotatably mounted. The wheels 49 are received in the grooves 23 of the tracks. Plate 16 may have the length equal to the length of a pallet.

There are two wheel carriers on each pallet so that each pallet can move on each pair of tracks. The carriers are attached to the underside of board 41 by screws 41a or in any other suitable manner.

There may be two rows of double tracks and two rows of pallets on each truck bottom.

Each pallet may be lifted by inserting the arms 50 of a lift fork truck in the spaces between the spacers 42. The pallet is lifted and set down on a plate 16 on either one side or the other of the truck body. The wheels 49 of the pallet placed on plate 16 will be spaced from the guides 17, 18. The fork truck is then withdrawn and the pallet pushed forwardly onto the tracks. The truck may be of a length to accommodate 5 pallets on each side of the truck, as shown in FIG. 1 or the truck body may be longer or shorter. The most rearward pallets may remain on plates 16 to hold the more forward pallets from sliding backwards. The wheel carriers can be made of aluminum extrusions, drilled to provide openings 48a for the wheel axles 48.

Each wheel carrier 45 can carry two wheels 49, one at each end of the carrier. As the pallet on plate 16 is pushed rearwardly, the guides 17, 18 guide the wheels toward the grooves 23 of the tracks.

The track sections and plates 16 can be easily assembled and easily disassembled. The tracks may be made as aluminum extrusions.

Figure 1A:
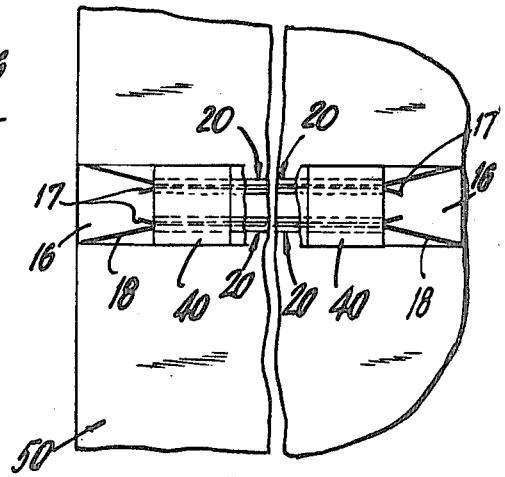

In FIG. 1A, the invention is illustrated as applied to a floor 50 of a warehouse, with plates 16 at both ends of the floor. Track sections 20, there between, in tandem, are joined together by attaching devices 25a. The end tracks are attached to plates 16 by attaching devices 25.

Loading of the pallets can be accomplished from either end of the tracks on floor 50.

It will be noted that the outer guides 18 are longer than the inner guides 17, to ensure that the pallets be guided to the tracks.

Figure 6:
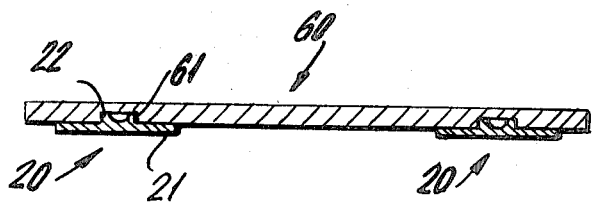
FIG. 6 is a cross-sectional view taken on line 6—6 of FIG. 1.

As shown in FIG. 6, a bar 60 is placed on the front ends of each pair of front tracks 20, at the inside of the front wall 12 of the truck body to properly space said pair of tracks. Said bar is of steel and has a pair of slots 61 at its underside to receive the raised rail portions 22 of a pair of tracks 20. The bar 60 rests on track bases or flanges 21 and keeps the pair of tracks properly spaced.

The plates 16, 26, 26a being nailed to the floor of the truck keeps all the parts of the system in position and to prevent the tracks from coming apart.

Plates 16, 26 and 26a have holes 59 in their corners to receive nails for attaching them to the floor 14 or to the floor 50.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative.

I claim:

1. In combination, a pair of parallel spaced track sections, each of said track sections having a groove in its upper side, said grooves being parallel spaced, a load supporting member comprising a platform, a pair of parallel spaced wheel carriers attached to the underside of said platform, and wheels rotatably mounted on said carriers to roll in said grooves, a plate at adjacent ends of said track sections, and means on said plate converging on each of adjacent track groove ends to guide wheels in contact with said plate into the adjacent ends of said track grooves.

2. The combination of claim 1, and means to connect one end of said plate to one end of said track sections.

3. The combination of claim 1, said sections each comprising a base in the plane of said plate.

4. The combination of claim 3, and means to connect one end of said plate to one end of said track sections.

5. The combination of claim 4, said connect means being provided with pins extending upwardly and passing through openings formed in said plate and through openings in each of said track sections.

6. The combination of claim 1, another pair of track sections in tandem with the first mentioned pair of track sections, first connect means to connect said plate to one end of said first mentioned pair of track sections, and second connect means to connect the other ends of the first pair of track sections to one end of said another pair of track sections.

7. The combination of claim 6, said first and second connect means being disengagably connected to said first pair of track sections.

8. The combination of claim 1, a floor, said plate being mounted on said floor and at one end of said floor.

9. The combination of claim 1, each of said track sections being of a length equal to one or more times the length of said platform.

10. The combination of claim 1, said tracks and said wheel carriers having major portions of uniform transverse cross-section.

11. The combination of claim 1, said converging guide means comprising a first elongated member and a second elongated member, said elongated members being angularly disposed one to the other so as to converge at one end of one of said grooves.

12. The combination of claim 11, said first elongated member being longer than said second elongated member and being disposed outwardly away from said pair of track sections.

13. In combination, a pair of spaced tracks, each of said tracks having a groove in its upper side so that said grooves are in spaced parallel relationship; a plurality of load supporting members, each of said members comprising, a platform, a pair of parallel spaced wheel carriers attached to the underside of each of said platforms, a pair of wheels, each of said wheels being rotatably mounted on each of said carriers, respectively, to roll in one of said grooves; said load supporting members being in tandem alignment on said tracks; and a plate at one end of adjacent ends of said tracks, and means on said plate converging on each of said adjacent track groove ends to guide said wheels in contact with said plate into the adjacent ends of said track grooves so as to permit a plurality of load supporting members to be mounted on said tracks in tandem alignment.

14. The combination of claim 13 wherein the length of said plate in the direction parallel to said tracks is about equal to the length of each of said platforms in the direction parallel to said tracks.

15. The combination of claim 14, wherein the length of each track is about equal to a multiple of the lengths of each of said platforms.

* * * * *